United States Patent [19]
Adomeit et al.

[11] Patent Number: 6,120,057
[45] Date of Patent: Sep. 19, 2000

[54] VEHICLE PASSENGER SAFETY METHOD AND AIR BAG MODULE FOR THE IMPLEMENTATION THEREOF

[75] Inventors: Heinz-Dieter Adomeit, Berlin; Thomas Marotzke, Bergfelde, both of Germany

[73] Assignee: Petri AG, Aschaffenburg, Germany

[21] Appl. No.: 09/269,870

[22] PCT Filed: Oct. 20, 1997

[86] PCT No.: PCT/DE97/02516

§ 371 Date: Apr. 1, 1999

§ 102(e) Date: Apr. 1, 1999

[87] PCT Pub. No.: WO98/17506

PCT Pub. Date: Apr. 30, 1998

[30] Foreign Application Priority Data

Oct. 22, 1996 [DE] Germany .................. 196 45 373

[51] Int. Cl.⁷ .................................................. B60R 21/16
[52] U.S. Cl. ...................... 280/731; 280/742; 280/750
[58] Field of Search ................... 280/728.1, 736, 280/741, 742, 731, 750, 728.2

[56] References Cited

U.S. PATENT DOCUMENTS 5,234,229  8/1993  Gordon .................................. 280/736
5,383,682  1/1995  Nagata et al. ........................ 280/777
5,826,901  10/1998  Adomeit ............................. 280/728.2

FOREIGN PATENT DOCUMENTS 357 225 A1    3/1990   European Pat. Off. .
44 30 588 C1  10/1995  Germany .
04135944      5/1992   Japan .
04166458      6/1992   Japan .
WO 90/09297   8/1990   WIPO .

*Primary Examiner*—Paul N. Dickson
*Attorney, Agent, or Firm*—Christie, Parker & Hale, LLP

[57] ABSTRACT

A vehicle passenger safety method in which a gas bag in an airbag module is inflated in between the passenger and parts of the vehicle when a crash occurs. The cover of the gas bag moves away from the passenger before the gas bag is inflated. Preferably, the gas bag and a diffuser, located in between an inflating device and the gas bag, also move away from the passenger. Compressed gas is released from the inflating device into the gas bag only when the above mentioned groups of components have been placed in a set position.

19 Claims, 6 Drawing Sheets

VEHICLE PASSENGER SAFETY METHOD AND AIR BAG MODULE FOR THE IMPLEMENTATION THEREOF

BACKGROUND OF THE INVENTION

The present invention relates to an airbag module.

In a position where a passenger is very close to the cover of the gas bag of an airbag module, which is also called the out off position (Oop), the opening airbag cap and the unfolding gas bag can cause considerable injury to the passenger. The passenger is struck in this position by the unfolding gas bag while in the normal sitting position he only contacts the gas bag after the bag has unfolded. A particularly dangerous situation then arises for the passenger if prior to the unfolding of the gas bag he is resting very close to the airbag module or if he is resting with his head or chest on the gas bag cover. On the passenger side there are additional dangers if the passenger is sitting in the wrong position relative to the airbag module.

In order to reduce these dangers, airbag modules are already known wherein at least one component part is pushed away from the passenger as the gas bag unfolds. Thus a gas bag system is known for vehicles from DE 44 30 588 C1 wherein the gas bag system is fixed on the motor vehicle so that it can be moved away at least in part from the vehicle passenger. The reaction forces which occur during the airbag function are used to move away the airbag module. The gas bag system is thereby fixed on elements which can be three-dimensionally or elastically deformed through the action of the gases which are formed. With this gas bag system the gas bag cover is also moved away from the passenger together with the remaining structural groups, such as gas generator, diffuser and gas bag.

With this arrangement the gas bag system is to be moved away from the passenger before the gas bag unfolds and the gas bag cover opens. However it cannot be ruled out that the unfolding process of the gas bag continues before the end of the moving process so that the gas bag cover opens before the minimum required distance has been reached between the folded gas bag and passenger.

The object of the invention is therefore to reduce the risk of danger for the passenger through an airbag unit.

SUMMARY OF THE INVENTION

With a method for securing a vehicle passenger where in the event of a crash a gas bag of an airbag module is inflated between the passenger and vehicle parts, it is proposed, according to the invention, that prior to the inflation of the gas bag at least the gas bag cover is moved away from the passenger. In a preferred embodiment it is proposed that, as well as the gas bag cover, the gas bag and a diffuser, located between an inflation device and gas bag, are moved away from the passenger. The movement away from the passenger can be accomplished by sliding, turning or tilting action. According to the present invention, prior to the opening of the gas bag, a gap is formed between the displaced gas bag cover and the adjoining fixed vehicle parts in which the gas bag can unfold freely after the gas bag cover is ripped open. The gas bag first unfolds sideways and only then towards the passenger. Furthermore, there is the advantage that owing to the greater distance of the gas bag cover from the passenger prior to the unfolding of the gas bag, the risk of injury through the opening gas bag cover is reduced particularly in the Oop case.

An airbag module with an inflation device, a diffuser, a gas bag and a gas bag cover is characterized according to the invention in that the diffuser, the gas bag and the gas bag cover can be moved away from the passenger out from a rest position and that the exit path of the compressed gases of the inflation device into the gas bag is only released after the said structural groups have moved into a predetermined position.

In a preferred embodiment of the invention, the inflation device is formed with the diffuser as a piston cylinder unit in the manner of a pneumatic differential cylinder wherein the diffuser can be moved together with the gas bag and gas bag cover away from the passenger as a cylinder under the influence of the gas streaming out of the inflation device and the outflow openings of the diffuser are only released by the piston for the gas to flow out into the gas bag after the diffuser has reached the position furthest away from the passenger.

With this arrangement the diffuser is thus moved away from the passenger together with the gas bag and gas bag cover under the influence of the gas flowing out of the inflation device whereby the gas cannot at first, flow into the gas bag. The gas bag cover cannot at first, be opened. Only after the diffuser has reached its position furthest away from the passenger, can gas flow through the outflow openings of the diffuser into the gas bag so that the gas bag can unfold whereby the gas bag cover is also opened.

During the opening of the gas bag cover cap, a minimum distance always exists between the cap and the passenger which allows the gas bag to unfold in front of the passenger. Under Oop conditions the stresses on the passenger through the unfolding cap and airbag are thereby reduced. This essential function is automatically carried out under all conditions. A control or phasing of the gas generator performance for Oop conditions can thereby be omitted under certain circumstances.

The efficiency of the airbag in passenger protection systems is hereby basically unaffected.

It is expedient if the inflation device is fixedly mounted and has a section formed as a piston whereby the outflow openings of the inflation device are provided on the side of the piston remote from the passenger, the diffuser is provided as a cylinder associated with the piston and having side outflow openings and on the side of the piston remote from the passenger a surface which can be biased with compressed gas opposite the passenger, whereby the cylinder extends in the rest position either side of the piston so that the outflow openings of the diffuser lie on the side of the piston facing the passenger.

In a first embodiment, a gas generator is provided which is integrated in the steering spindle. At the upper end of the hollow steering spindle is a nut which has an aperture and on which the piston is provided and the fixed nut has, between the piston and its fastening point on the steering spindle, a cylindrical section which corresponds to the displacement path of the diffuser, and also has outflow openings wherein the diameter of the piston is larger than that of the cylindrical section. The nut and cylindrical section thus represent the piston rod.

In a second embodiment a pot-shaped gas generator is provided which has at one end, facing the passenger, a plate-like piston with a larger diameter than the gas generator. In this case the gas generator represents the piston rod.

The diffuser is preferably fixed on a base plate, which adjoins the cylindrical section of the nut, and with its outer edge adjoins a vertically aligned edge of a gas bag cover and is locked with this through a security plate. The base plate slides during displacement of the diffuser along the gas generator or the cylindrical section of the nut so that the gas cannot or can only slightly escape there. As a result of the locking of the gas bag cover with the base plate the gas bag cover can be moved away from the passenger together with the diffuser.

In a further embodiment, the diffuser is fixed on a support plate which is locked by a security plate to a vertical edge of a gas bag cover.

It is further expedient if the diffuser is mounted in the rest state in a self-supporting folded gas bag.

In order to achieve an improved sealing and sliding, as well as to reduce or avoid noise occurring between the mutually sliding parts during driving, in a further embodiment, a sealing and slide element, which is preferably made of plastics, is provided between the piston and diffuser as well as between the gas generator and support plate.

For a secure hold of the diffuser in its end positions it is expedient to provide positive-locking holders.

In one embodiment of a positive-locking holder it is proposed that the cylindrical section and gas generator have in their center areas a collar which has a larger diameter and that an elastically deformable inner edge of the diffuser support is associated with this collar.

The airbag module must in its starting position be secured against axial displacement under normal conditions. It must not be displaced by forces exerted by the driver on same (e.g., by operating the horn). It is however expedient, if in the event of head-on impact, as a result of a collision with a vehicle, deceleration below the airbag release threshold, the return path available with the solution according to the invention is used to reduce the load on the passenger. This is possible in that the reverse acceleration of the airbag module as a result of the head-on impact is controlled through a defined force/path characteristic (energy absorption) over the return path whereby the head-on strain is reduced. A defined counter force is available to hold the airbag module in the starting position and over the entire return path.

To reduce the strain on the passenger in the event of head-on impact the diffuser can be designed deformable or the entire airbag module can be mounted in energy-absorbing manner by the provision of deformation elements. In the event of the airbag release this counter force is overcome by the return mechanism.

In a further embodiment it is proposed that the inflation device is mounted on a distance member which is fixed on the steering wheel hub. In this embodiment it is proposed that a sealing element is provided between the distance member and a security plate connected to the diffuser.

DESCRIPTION OF THE DRAWINGS

The invention will now be explained in further detail with reference to embodiments shown in the drawings in which.

DETAILED DESCRIPTION OF THE INVENTION

Figure 1:
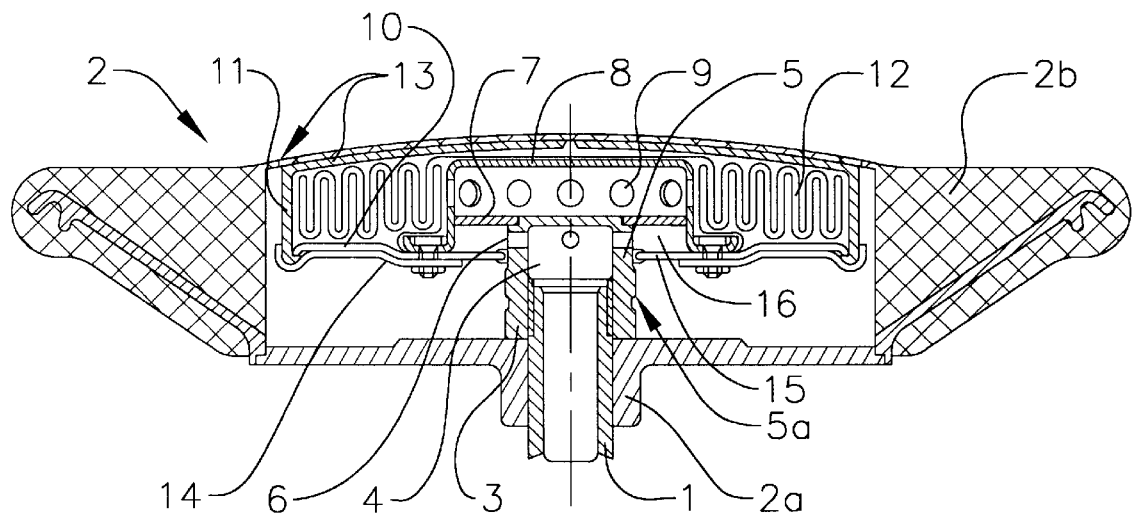
FIG. 1 is a sectional view through a driver airbag module with gas generator integrated in the steering column at the start of detonation of the gas generator with the diffuser in the starting position.

In the embodiment of FIG. 1, the steering spindle 1 is provided with an integrated gas generator which is not shown in the drawing. A two-part steering wheel 2 is seated on the steering spindle 1 and has a hub 2a and a steering wheel rim 2b. The steering wheel hub 2a is fixed on the steering spindle by means of a nut 3. The nut 3 is shaped in a special way. It has a bore 4 in order to allow the gas to pass out from the gas generator integrated in the steering spindle. Furthermore it has a cylindrical section 5 with radial bores 6 for the outlet of the gas from the nut. The cylindrical section 5 is provided in the middle with a collar 5a which has a larger diameter than the part of the section 5 lying above and below the collar. At the top end, the nut 3 is provided with a flat piston 7. The piston and the nut are preferably separate component parts, which can be assembled together, e.g., screwed together whereby the nut has at its upper end an external thread and the piston 7 has a corresponding inner thread.

The piston 7 is enclosed by a diffuser 8 as a cylinder which has outflow openings 9 on its circumference. The diffuser 8 is fixed on a base plate 10 which on one side adjoins the cylindrical section 5 and on the other side adjoins an inner edge part 11 of a gas bag cover 13. The gas bag 12 is also fixed on the base plate and in the present embodiment is folded next to the diffuser. The gas bag cover extends over the diffuser 8 and the gas bag 12. Furthermore a security plate 14 is provided which ensures the positive locking connection between the edge part 11 and the base plate 10. The diffuser 8 is thus held in the starting position shown in FIG. 1.

A ring-shaped surface 15 extends as section of the base plate 10 between the wall of the diffuser 8 and the cylindrical section 5 of the nut 3. Since the piston 7 has a larger diameter than the cylindrical section 5 a space 16 exists between this and the diffuser 8 on one side and between the piston 7 and ring-shaped surface 15 on the other.

In the starting position, i.e. prior to detonation of the gas generator, the inner edge of the base plate 10 which is elastically deformable adjoins the cylindrical section 5 above the collar 5a. The collar together with the fastening of the base plate on the gas bag cover prevents the airbag module from moving away from the passenger when lesser force is applied to the gas bag cover.

After detonation of the gas generator in the event of a crash, the gas passes through the radial bores 6 into the space 16. As a result of the gas pressure on the ring-shaped surface 15, the fixing of the airbag module is overcome and the entire airbag module together with the diffuser 8, gas bag 12 and gas bag cover is moved downward. Thus at first no gas can pass out of the space 16 into the gas bag 12 since the radial bores 6 are located underneath the piston 7 while the outflow openings 9 of the diffuser 8 are above the piston 7. The displacement is possible since the pressure above the piston 7 in the space between this and the diffuser 8 is less than the pressure in the space 16.

Figure 2:
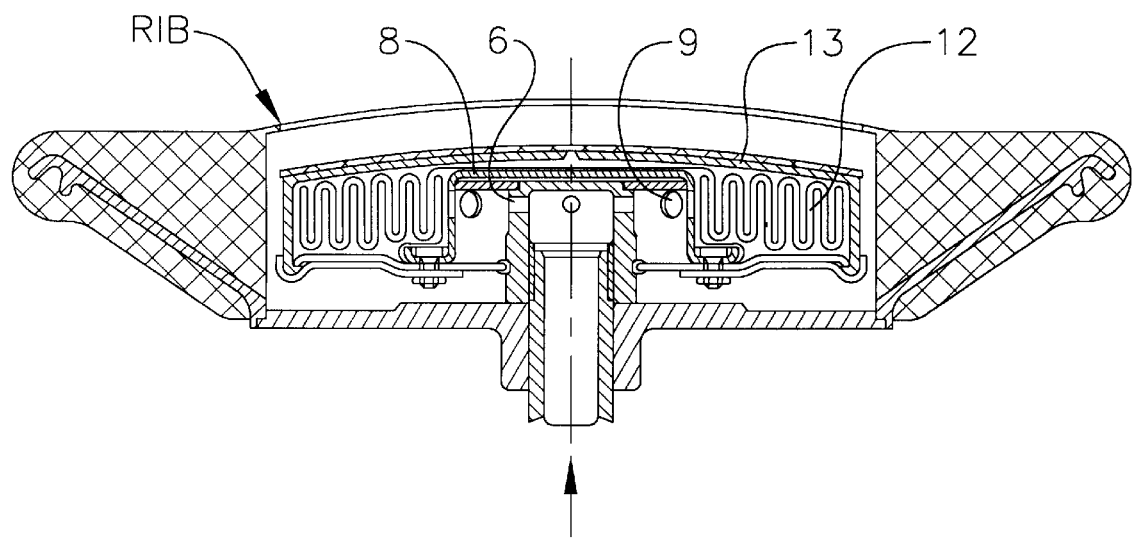
FIG. 2 is a section through the driver airbag module according to FIG. 1 after displacement of the diffuser into its end position.

The diffuser 8, gas bag 12 and gas bag cover 13 are moved in this way away from the passenger. Since in the present embodiment, a steering wheel with a so-called seamless design is used wherein the gas bag cover 13 and steering wheel are formed in one piece, during the reverse movement of the airbag module the gas bag cover 13 tears open at the edge which is formed as the ideal break point, as shown in FIG. 2. The outflow openings 9 of the diffuser travel over the piston as it moves. The outflow openings 9 likewise only lie underneath the piston 7 immediately before the diffuser 8 has reached its lower end position which is determined by its bearing on the piston 7 so that the gas can now flow into the gas bag 12 (FIG. 2) which has the result that the gas bag cover is also opened. In this lower position the inner edge of the base plate 10 is located underneath the collar 5a. The inner edge of the base plate 10 which is deformed during displacement in the area of the collar assumes its original shape again after overcoming the collar. It is thus ensured that the airbag module remains in the lower position.

In the present invention, the unfolding of the gas bag and the opening of the airbag module only take place after the return movement of the diffuser and gas bag so that a minimum spacing is always present between the passenger and the airbag module or gas bag cover. For this return no additional drives and no control technology are required. The return force can be adjusted over the ring-shaped surface and through the sizes of the gaps between the piston 7 and diffuser 8.

Figure 3:
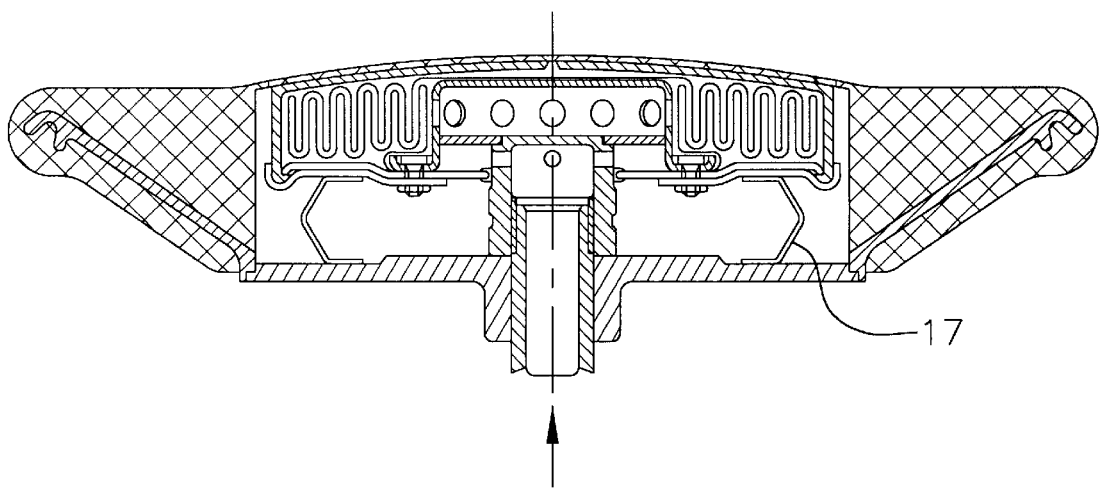
FIG. 3 is a sectional view through an airbag module according to FIG. 1 with energy absorbing bearing.
Figure 4:
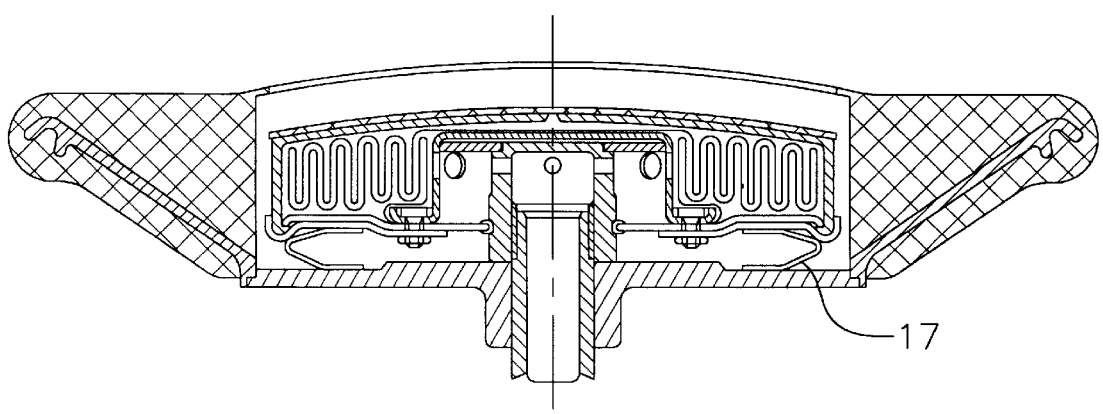
FIG. 4 shows the airbag module of FIG. 3 after movement of the diffuser to its end position.

The embodiment of FIGS. 3 and 4 shows the same basic construction as the embodiment of FIGS. 1 and 2. The difference is in the type of fixing used for the airbag module in the starting and end positions. The airbag module is in this embodiment mounted on plastically deformable deformation elements 17 in the form of bending plates. These also ensure that the airbag module cannot be displaced by slight forces below the restraint force required for head-on impact, such as, e.g., through the operation of the horn. After detonation of the gas generator the airbag module is moved from the position shown in FIG. 3 as a result of deformation of the deformation elements 17 into the position shown in FIG. 4.

Figure 5:
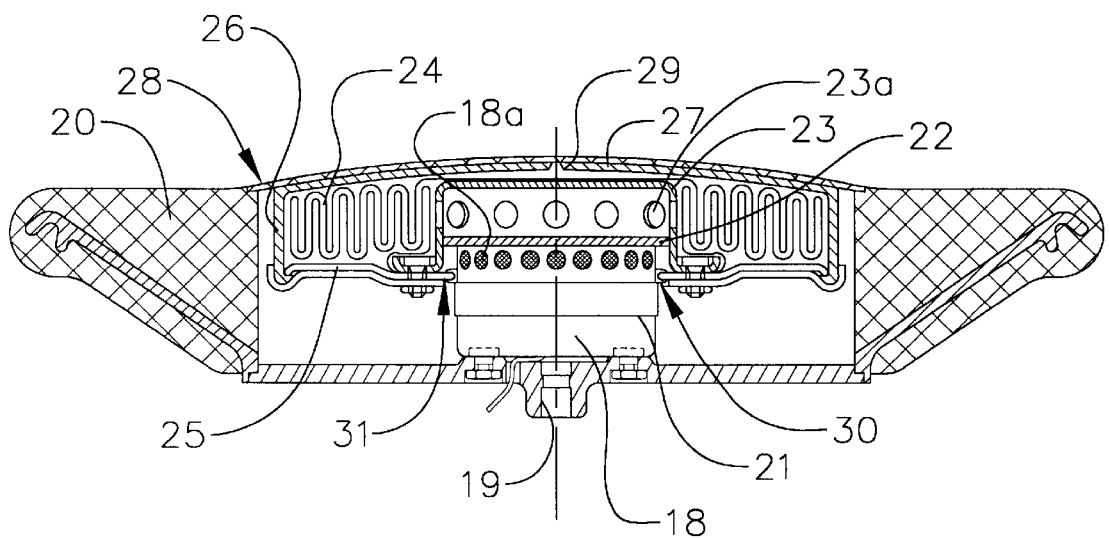
FIG. 5 is a sectional view through an airbag module with pot generator for the driver side with the diffuser in the starting position.

In the embodiment of FIG. 5, a drive airbag module is shown having a pot-shaped gas generator 18 which is fixed on the steering wheel hub 19 of a steering wheel 20 and has outflow openings 18a. The gas generator 18 is cylindrical, has a smooth surface and represents the piston rod. The gas generator 18 is provided in its center area with a collar 21 which has the same function as the collar 5a in the preceding embodiment.

A metal plate 22 which forms the piston is attached to the top side of the gas generator. A diffuser 23 is provided as a cylinder which is mounted in a self-supporting gas bag 24 folded next to the diffuser whereby the two are fixedly mounted on a support plate 25. The diffuser has outflow openings 23a. Furthermore the support plate 25 is locked with an inner part 26 of a gas bag cover 27 which covers the gas bag at the sides and at the top. The gas bag cover 27 is pressed at the edge with positive locking into the steering wheel 20 and there has a flexible area 28. Furthermore, a rip seam 29 is provided as ideal break point for the airbag unfolding in the middle of the gas bag cover. The support plate 25 is ring-shaped and has on the inner edge an elastically deformable plastics part 30 which adjoins the gas generator 18. The use of the plastics part is expedient since this improves the sliding ability and seal between the support plate and gas generator during displacement of the airbag module and helps to absorb noise since, for example, the rattling noises as a result of vehicle vibrations at the interface between diffuser and gas generator are reduced. A similar plastics part can also be provided at the edge of the sheet metal plate 22 to improve the sliding ability and seal relative to the diffuser 23.

The surface 31 of the support plate 25 lying between the gas generator 18 and side wall of the diffuser 23 corresponds to the surface 15 of the first embodiment which is exposed to the pressure of the gas streaming out of the gas generator and causes the diffuser to move downwards.

The method of operation corresponds to that of the embodiment in FIGS. 1 and 2. With the starting position shown in FIG. 5 the plastics part 30 adjoins the gas generator above the collar 21 whereby the airbag module also remains fixed in its upper position in the event of slight force action.

With downward movement of the airbag module, the flexible area 28 of the gas bag cover 27 is deformed so that the gas bag cover can move downwards with the airbag module without damaging the rip seam 29. At the end of the downward movement of the airbag module the plastics part 30 adjoins the gas generator 18 underneath the collar 21 whereby a return movement of the airbag module is prevented.

Figure 6:
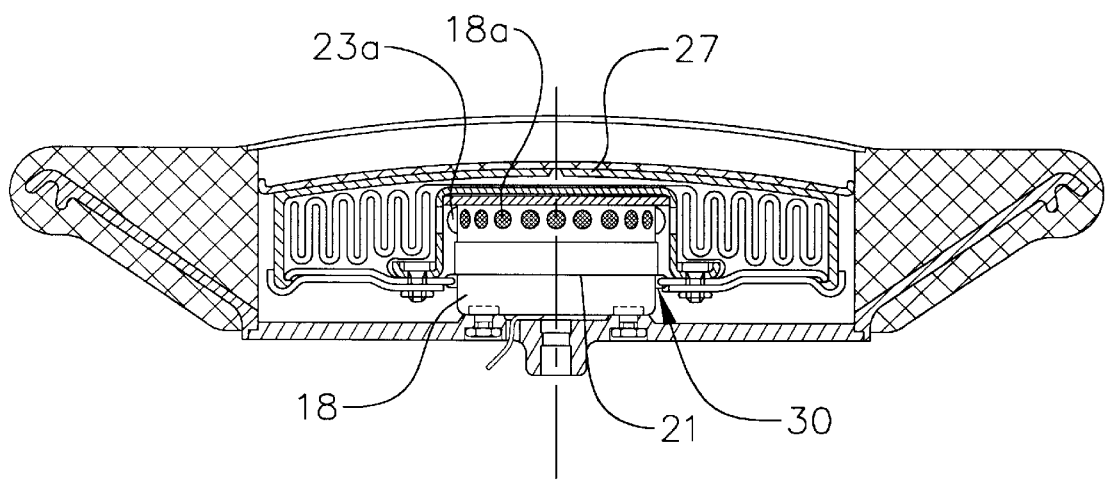
FIG. 6 shows the airbag module of FIG. 5 after movement of the diffuser into its end position.
Figure 7:
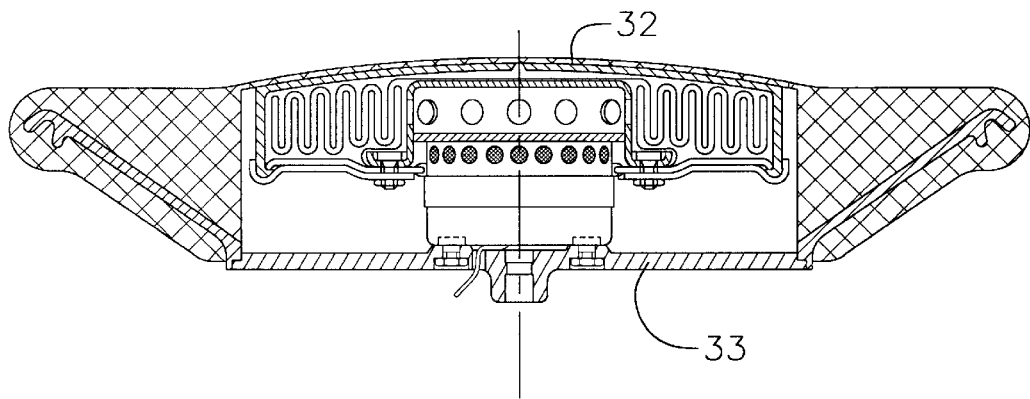
FIG. 7 is a sectional view through an airbag module in a steering wheel wherein the gas bag cover and the steering wheel rim form one unit in the starting position of the diffuser.
Figure 8:
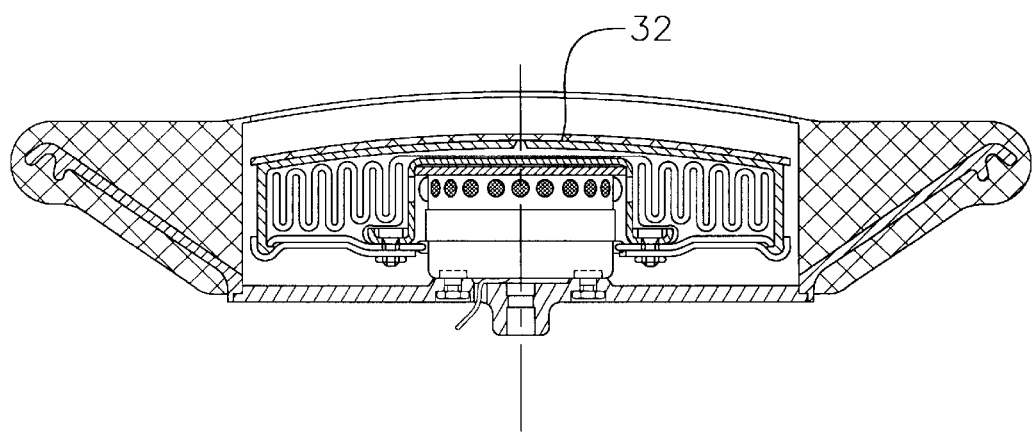
FIG. 8 shows the airbag module according to FIG. 7 after displacement of the diffuser into its end position.

The embodiment of FIGS. 7 and 8 differs from that of FIGS. 5 and 6 in that the gas bag cover 32 and the steering wheel consist as with the embodiment of FIGS. 1 and 2 of one piece whereby the steering wheel is designed in two parts wherein the steering wheel hub 33 represents a separate part.

The possible return path is dependent on the space available in the steering wheel and the structural release in detail, e.g., on the type of gas generator.

Figure 9:
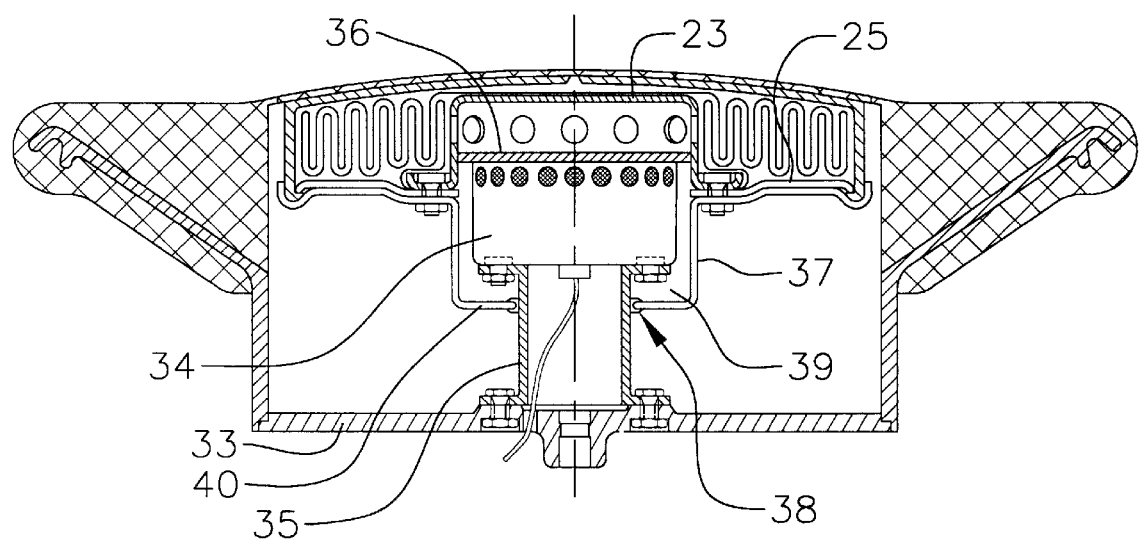
FIG. 9 shows an embodiment wherein the gas generator is connected to the steering wheel through an intermediate member.

With the embodiment of FIG. 9, as opposed to the embodiment of FIGS. 7 and 8, a gas generator 34 is fixed on a cylindrical spacer member 35, the spacer member having a smaller diameter than the gas generator and being fixed on the steering wheel hub 33. A metal plate 36 is provided as piston on the gas generator 34 and its edge adjoins the diffuser 23. Furthermore an angular security plate 37 is provided which is connected to the support plate 25 and which has a plastics part 38 which adjoins the cylindrical wall of the spacer member 35.

The method of functioning corresponds to that of the preceding embodiments. The additional advantage lies in the fact that an enlarged pressure chamber 39 is provided. The gas flow from the gas generator is thereby prevented to a lesser degree and a larger ring face 40 is provided. As a result of the larger ring face larger return forces are present and lower pressures are required whereby the return speed of the airbag module is likewise increased. The time taken for the gas to enter the gas bag is thereby shortened.

The spacer member also allows a simple adaptation to different airbag modules by changing the diameter of the cylindrical track face of the spacer member.

A further advantage lies in the fact that the bearing faces of the plate 36 against the diffuser and of the plastics part 38 against the spacer member lie further apart than the corresponding support points of the previous embodiments. This has a positive effect on the path of movement of the airbag module.

Figure 10:
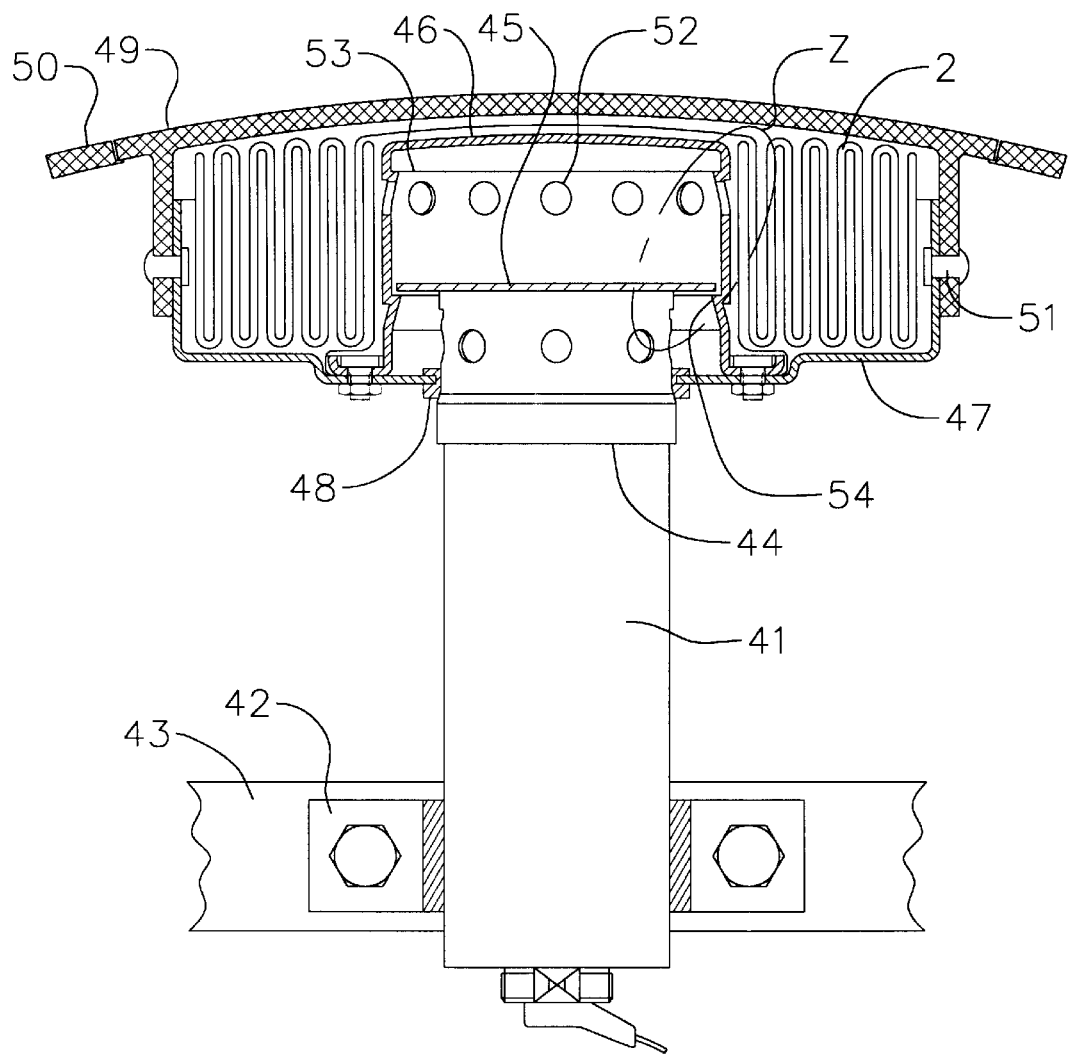
FIG. 10 shows a section through a passenger airbag module with the diffuser in the starting position.

FIG. 10 shows an embodiment for a passenger airbag. A cylindrical gas generator 41 is provided which is attached by a generator fastening 42 to the cross support 43. The gas generator 41 is provided with a collar 44 which has a larger diameter than the remaining sections of the gas generator. At the top end of the gas generator is a fixed flat piston 45 whose diameter as in the previous embodiments is larger than that of the gas generator. The piston is enclosed by a diffuser 46 which is fixed on a support plate 47. The support plate encloses the gas generator 41 and adjoins this with the interposition of a plastics ring 48. A gas bag cover 49 is fixed, e.g., by means of blind rivets 51 on the outer edge of the support plate 47. The gas bag cover 49 runs flush with the dash board 50.

Figure 11:
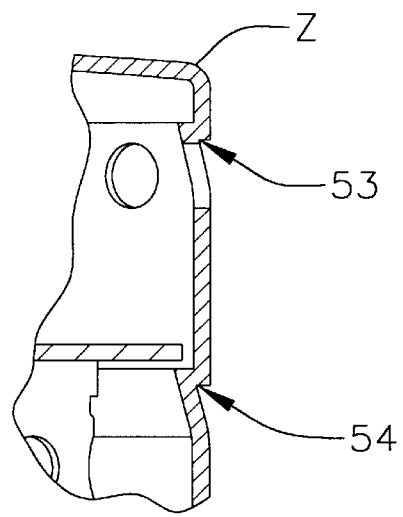
FIG. 11 shows an enlarged detail z of the diffuser according to FIG. 10.

As can be seen from FIG. 11 the diffuser has circumferential swages 53 and 54 above and below its outflow openings 52 and these serve to fix the diffuser in the starting and end position. In the starting position shown in FIG. 10, the diffuser is fixed on one side through the plastics part 48 adjoining the top of the collar 44 in the direction away from the passenger and on the other side through the swage 54 engaging behind the piston 45 in the direction towards the passenger.

The method of functioning after detonation of the gas generator corresponds to that in the preceding embodiments. As the diffuser moves with the gas bag and gas bag cover away from the passenger the plastics ring 48 and the inwardly projecting part of the swage 53 are elastically deformed on moving over the collar 44 and piston edge. In the end position where the diffuser 46 rests on the piston 45 the swage 53 engages underneath the piston 45 and thus prevents the diffuser and parts connected to same from moving back.

What is claimed is:

1. A method for securing a vehicle occupant in the event of a crash, comprising:

inflating a gas bag of an airbag module between the occupant and vehicle parts;

moving a gas bag cover away from the occupant through gases emerging from an inflation device prior to the inflation of the gas bag; and releasing gases into the gas bag after the gas bag cover has been moved to a predetermined position.

2. The method according to claim 1 wherein the gas bag and a diffuser, located between the inflation device and the gas bag, are moved away from the occupant together with the gas bag cover.

3. An airbag module for securing a vehicle passenger in the event of a crash, comprising:

an inflation device, having an outlet path for directing gas into a gas bag;

a gas bag and a gas bag cover;

a diffuser located between the inflation device and the gas bag;

wherein the diffuser, the gas bag and the gas bag cover can be moved away from a passenger position into a predetermined position and wherein the outlet path of the inflation device is only in communication with the gas bag after the diffuser, the gas bag and the gas bag cover have moved into said predetermined position.

4. An airbag module according to claim 3 wherein the inflation device with the diffuser is formed as a piston cylinder unit wherein the diffuser can be moved together with the gas bag and the gas bag cover away from the passenger position under the influence of the gas flowing out of the inflation device, and wherein the diffuser comprises a plurality of outflow openings which are only in communication with the inflation device after the diffuser has reached said predetermined position.

5. An airbag module according to claim 3 wherein the inflation device is fixedly mounted and has a section formed as a piston wherein outflow openings of the inflation device are provided on the side of the piston remote from the passenger, wherein the diffuser is provided as a cylinder associated with the piston and has side outflow openings, wherein on the side of the piston remote from the passenger position a surface is biased with compressed gas, and wherein the diffuser extends in a rest position to either side of the piston so that the outflow openings of the diffuser lie on the side of the piston facing the passenger position.

6. An airbag module according to claim 3 wherein the inflation device comprises a gas generator integrated in a steering spindle, the steering spindle being hollow and having an upper end, a nut at the upper end of the hollow steering spindle having an aperture wherein a piston is provided on the nut, and the nut has between the piston and its fastening point on the steering spindle a cylindrical section which corresponds to the displacement path of the diffuser wherein the diameter of the piston is larger than that of the cylindrical section, the cylindrical section further comprising outflow openings.

7. An airbag module according to claim 3 wherein the inflation device comprises a pot-shaped gas generator having at one end facing the passenger position a piston with a larger diameter than the gas generator.

8. An airbag module according to claim 6 wherein the diffuser is fixed on a base plate which adjoins the cylindrical section of the nut and wherein an outer edge of the base plate adjoins a vertically aligned edge of the gas bag cover and is locked with the vertically aligned edge through a security plate.

9. An airbag module according to claim 3 wherein the diffuser is fixed on a support plate which is locked with a vertical edge of the gas bag cover by means of a security plate.

10. An airbag module according to claim 3 wherein the diffuser is mounted in a rest state in a self-supporting folded gas bag.

11. An airbag module according to claim 5 wherein a sealing and slide element is provided between the piston and the diffuser well as between the gas generator and a support plate.

12. An airbag module according to claim 11 wherein the sealing and slide element comprises a plastics part.

13. An airbag module according to claim 3 wherein the diffuser is held in keyed engagement in an end position.

14. An airbag module according to claim 6 wherein the cylindrical section and the gas generator have a center area with a collar, the collar having an enlarged diameter, wherein an elastically deformable inner edge of a diffuser support is associated with this collar.

15. An airbag module according to claim 3 wherein the diffuser is deformable.

16. An airbag module according to claim 3 wherein the airbag module is fixed on a plastically deformable deformation element.

17. An airbag module according to claim 3 wherein the inflation device is mounted on a spacer member which is fixed on a steering wheel hub.

18. An airbag module according to claim 17 comprising a sealing element provided between the spacer member and a security plate connected to the diffuser.

19. An airbag module according to claim 3 wherein the airbag module is mounted so as to be energy-absorbing.

* * * * *